US009307269B2

(12) United States Patent
Martin et al.

(10) Patent No.: US 9,307,269 B2
(45) Date of Patent: Apr. 5, 2016

(54) DETERMINING INTEREST LEVELS IN VIDEOS

(71) Applicant: Google Inc., Mountain View, CA (US)

(72) Inventors: Alberto Martin, Kirkland, WA (US);
David Dorwin, Kirkland, WA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/830,941

(22) Filed: Mar. 14, 2013

(65) Prior Publication Data

US 2014/0282661 A1 Sep. 18, 2014

(51) Int. Cl.
| | |
|---|---|
| *H04H 60/32* | (2008.01) |
| *H04N 21/234* | (2011.01) |
| *H04N 21/442* | (2011.01) |
| *H04N 21/472* | (2011.01) |
| *H04N 21/658* | (2011.01) |
| *H04N 21/81* | (2011.01) |

(52) U.S. Cl.
CPC ... *H04N 21/23418* (2013.01); *H04N 21/23424* (2013.01); *H04N 21/44222* (2013.01); *H04N 21/47217* (2013.01); *H04N 21/6582* (2013.01); *H04N 21/812* (2013.01)

(58) Field of Classification Search
USPC ........................................................ 725/9–21
See application file for complete search history.

(56) References Cited

U.S. PATENT DOCUMENTS

| | | | | |
|---|---|---|---|---|
| 7,603,682 | B1* | 10/2009 | Akiyama ................ H04H 20/82 | 725/139 |
| 8,392,834 | B2* | 3/2013 | Obrador ............ G06F 17/30017 | 715/719 |
| 2004/0085483 | A1 | 5/2004 | Li et al. | |
| 2004/0098744 | A1 | 5/2004 | Gutta | |
| 2005/0223322 | A1* | 10/2005 | Graham ................ G06F 3/1206 | 715/255 |
| 2006/0218573 | A1* | 9/2006 | Proebstel ............... H04H 60/33 | 725/14 |
| 2007/0061195 | A1 | 3/2007 | Liu et al. | |
| 2009/0265737 | A1 | 10/2009 | Issa et al. | |
| 2011/0088053 | A1* | 4/2011 | Lee ......................... H04H 60/45 | 725/19 |
| 2012/0327243 | A1* | 12/2012 | Rezvani ........................ 348/158 | |
| 2012/0331106 | A1* | 12/2012 | Ramamurthy . H04N 21/234327 | 709/218 |
| 2013/0179931 | A1* | 7/2013 | Osorio .................. G06F 15/167 | 725/110 |

FOREIGN PATENT DOCUMENTS

WO WO 2011-053052 A2 5/2011

OTHER PUBLICATIONS

PCT International Search Report and Written Opinion for PCT/US2014/026909, Jul. 18, 2014, 7 Pages.

* cited by examiner

*Primary Examiner* — Pinkal R Chokshi
*Assistant Examiner* — Alexander Gee
(74) *Attorney, Agent, or Firm* — Fenwick & West LLP

(57) ABSTRACT

A video is analyzed to identify interest level for a plurality of frames. The interest level is determined based on analysis of the content of each of the plurality of frames or how often other clients view the frames or take actions while viewing the frames. Frames are clustered and key frame locations are determined for each of the clusters. Key frames are given a higher buffering priority than non key frames. Buffering of key frames is prioritized based on key frame interest level. Key frames are also utilized to enable a client to skip forward or backward between key frames and view content that is likely to be of interest to the user.

16 Claims, 6 Drawing Sheets

DETERMINING INTEREST LEVELS IN VIDEOS

FIELD OF DISCLOSURE

This invention generally relates to video retrieval and playback, and particularly to identifying sections of video which are likely to be of interest to a user, and generating key frames for those sections.

DESCRIPTION OF THE RELATED ART

Content hosting services provide users with online access to videos and other types of media content. A user requests a video from the hosting service, which then transmits the video the user's client device. The client device typically will begin playback only after the video has been sufficiently buffered, before the content has been fully downloaded to a client device. This allows a user to begin viewing a video sooner and without interruption given sufficient bandwidth during playback. When loading videos for playback, video players typically load a video file in chronologically linear manner in the order that the video will play by in this order without user interaction. However, users may jump past some portion of the video that has been loaded to begin watching at a later portion, resulting in an interruption in playback while the video player again buffers the video for playback.

SUMMARY

A video is analyzed by a video hosting server to identify an interest level for each of a plurality of frames in the video. The interest level of a frame is a figure of merit determined by one or more quantitative factors. One type of factor represents user behavior in accessing frames of the video in a non-linear manner, such as how often clients access the video by jumping or seeking to the temporal location of the video displaying the frame. For example, repeatedly seeking in a video, but then stopping and letting playback proceed is a strong indicator of interest in the location at which playback proceeded. Another type of factor is based on the audio and visual content of the video, and identifying temporal locations that are likely to be of interest to user of a client, such as frames with significant motion, scene changes, changes in audio volume or content, or the like. Based on these factors an interest level is computed for the frame or set of frames. One or more frames within the plurality of frames are then identified as key frames by having an interest level exceeding an interest threshold. The identified key frames can be used to prioritize which portions of the video to automatically buffer when the video is loaded by a client. Key frame information can also be used to prioritize content distribution optimization. Automatically buffered portions can be begin at a key frame or contain a key frame. The length of a buffered portion may be set to a default value or determined based on factors that may include the interest level of frames temporally located near the key frame. Additionally, the video player can use the key frames when it receives a request to skip forward or backward to automatically move the playback point forward or backward, whichever is requested, to the nearest key frame in the video, thereby providing a variable skip feature. In one embodiment, identification of key frames may allow advertisements to be placed in a video prior to key frames that are likely to be of interest to a user. Similarly, portions of video identified by key frames may require payment to view, while non key frame portions of video, or a subset of key frame portions of video may be freely available as a preview.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The computing system automatically identifies key frames in a video that are likely to be of interest to a user, and utilizes the key frames to enhance the viewing experience of the user by enabling non-linear downloading of the video the client device, so that the user can immediately start viewing a key frame subsequent to the start of the video, as well as enabling variable skip forward and skip backward from a current frame to the nearest key frame. Key frames, as discussed in this application, are frames of video that are identified as frames of video that are likely, or have demonstrated, to be of high interest to users. This is not to be confused with the use of "key frames" when referring to frames encoded without reference to any frame except themselves in video compression. This is also not to be confused with the user of "key frames" when referring to drawings that define starting and ending points of any smooth transition in animation and filmmaking. The key frames identifying high levels of interest, as discussed in this application, may be used regardless of whether any compression or animation is involved. The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable, similar or like reference number may be used in the figures and may indicate similar or like functionality.

Figure 1:
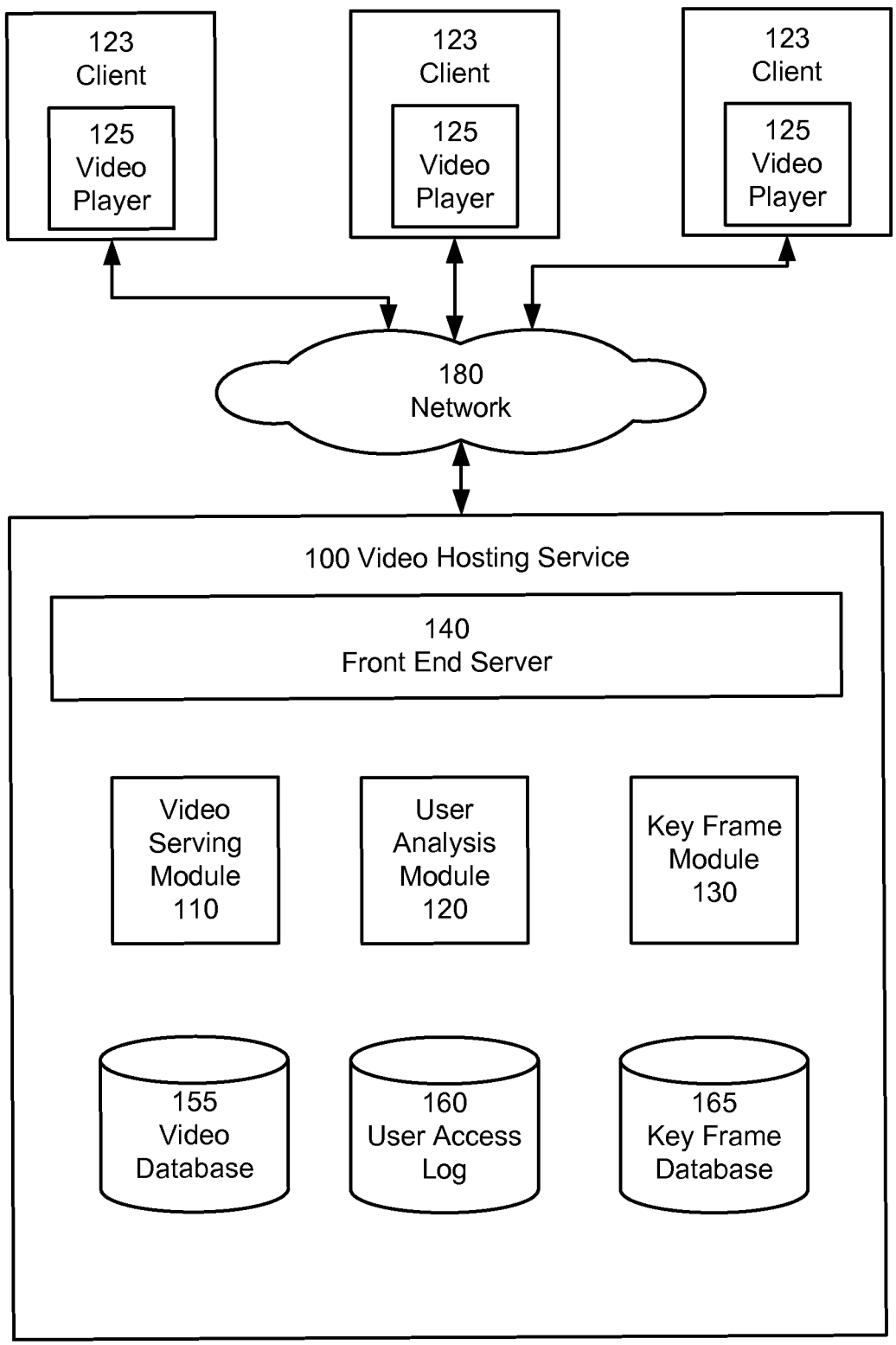
FIG. 1 is a block diagram of the system architecture according to one embodiment.

FIG. 1 illustrates a system environment for determining and utilizing key frames. A video hosting service 100 includes a front end web server 140, a video serving module 110, a user analysis module 120, a key frame module 130, a video database 155, a user access log 160, and a key frame repository 165. Video hosting service 100 is connected to a network 180. FIG. 1 also includes a client 123 running a video player 125. Client 123 is also connected to the network 180.

Many conventional features, such as firewalls, load balancers, application servers, failover servers, network management tools and so forth are not shown so as not to obscure the features of the system. A suitable service for implementation of the system is the YOUTUBE™ service, found at www.youtube.com; other video hosting services are known as well, and can be adapted to operate according to the teaching disclosed here. The term "service" represents any computer system adapted to serve content using any networking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

Figure 2:
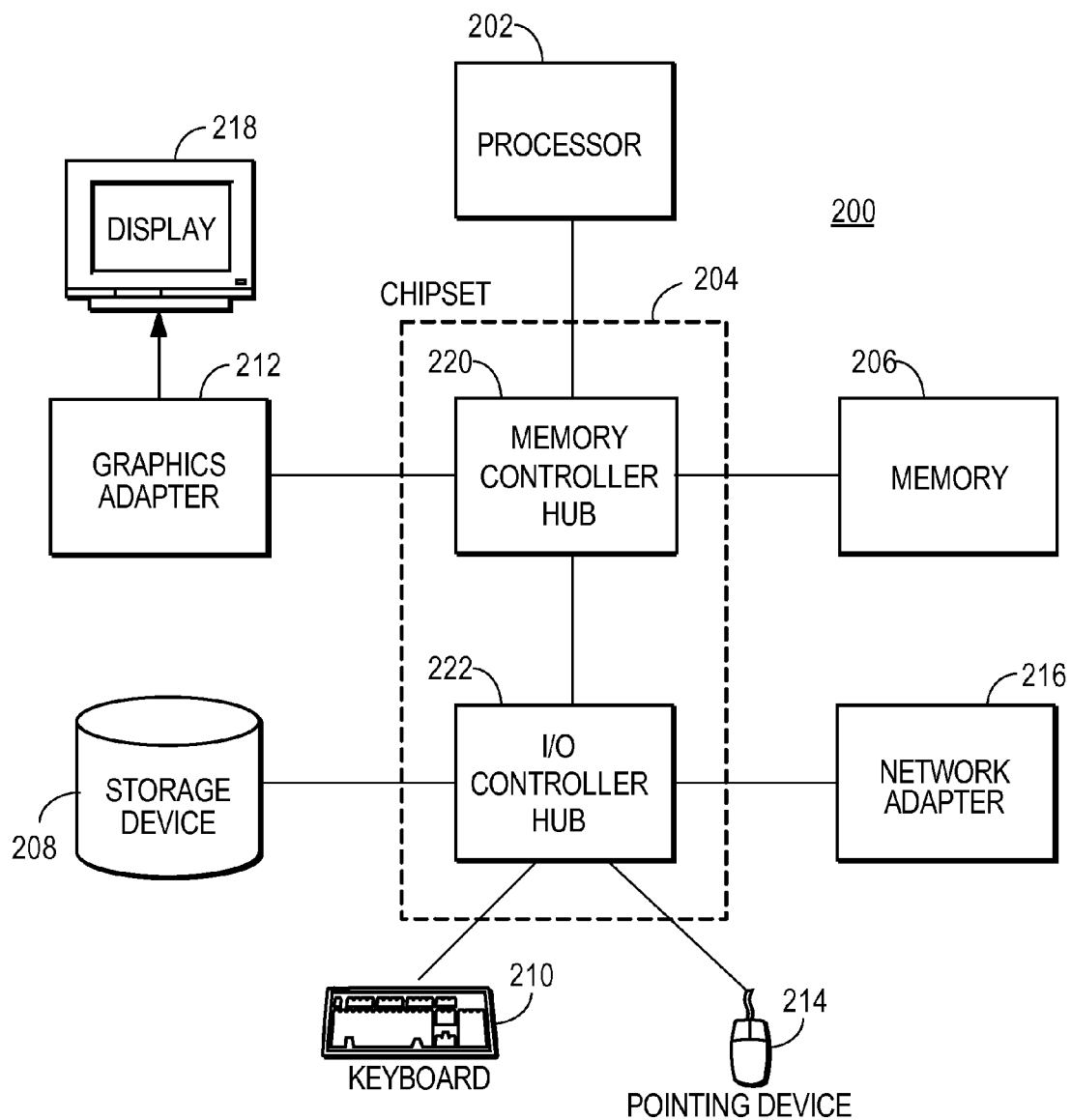
FIG. 2 is a block diagram illustrating an example of a computer for use as a client according to one embodiment.

The servers and modules described herein are implemented as computer programs executing on server-class computers comprising a CPU, memory, network interface, peripheral interfaces, and other well known components. The computers themselves in some embodiments run a conventional proprietary or open-source operating system such as Microsoft Windows, Mac OS, Linux, etc., have generally high performance CPUs, a gigabyte or more of memory, and gigabytes, terabytes, or more of disk storage. Of course, other types of computers can be used, and it is expected that as more powerful computers are developed in the future, they can be configured in accordance with the teachings here. An example of a suitable computer is illustrated in FIG. 2. The functionality implemented by any of the elements can be provided from computer program products that are stored in tangible computer readable storage mediums (e.g., RAM, hard disk, or optical/magnetic media). The details of the operation and structure of computer such as illustrated in FIG. 2 are well known, and are not repeated here.

A client 123 connect to the front end server 140 via network 180, which is typically the internet, but can also be any network, including but not limited to any combination of a LAN, a MAN, a WAN, a mobile, wired or wireless network, a private network, or a virtual private network. While only three clients 123 are shown, it is understood that very large numbers (e.g., millions) of clients can be supported and can be in communication with the video hosting service 100 at any time. A client 123 may include a variety of different computing devices. Examples of client devices 123 are personal computers, digital assistants, personal digital assistants, cellular phones, mobile phones, tablet computers, smart phones or laptop computers. As will be clear to one of ordinary skill in the art, the present invention is not limited to the devices listed above.

A client 123 includes a video player 125 through a browser (not shown) or a dedicated application that allows client 123 to present digital content provided on the video hosting service 100. Suitable browsers include, for example, Microsoft Internet Explorer, Netscape Navigator, Mozilla Firefox, Apple Safari, and Google Chrome. The client 125, video player 125 and/or browser may include HTML or Javascript to enable video playback and enhance the user interface. The browser can also include or a support a plug-in for a video player (e.g., Flash™ from Adobe Systems, Inc.), or any other player adapted for the video file formats used in the video hosting service 100. Alternatively, videos can be accessed by a program separate from a browser. Suitable dedicated video players include Quicktime, and Windows Media Player.

The digital content items can include, for example, video, audio or a combination of video and audio. For purposes of convenience and the description of one embodiment, the digital content items will be referred to as a "video," "video files," or "video items," but no limitation on the type of digital content items are intended by this terminology. Other suitable types of digital content items include audio files (e.g. music, podcasts, audio books, and the like), multimedia presentations, and so forth.

The video hosting service 100 provides videos that have been uploaded by other users of the video hosting service 100, or may have been provided by the video hosting service operator, or by third parties. Clients 123 can search for videos based on keywords or other metadata. In one embodiment, these requests are received as queries by the front end server 140 and provided to the video serving module 110.

Video database 155 stores videos provided to clients 123. Each video in one embodiment has a video identifier (ID). Each video file has associated metadata that includes video ID, author, title, description, and keywords, additional metadata can be included as available. In one embodiment, the metadata associated with a video includes key frame locations. Alternatively, the key frame metadata may be stored in the key frame database 165. For the purpose of this discussion, key frame locations will be discussed as stored in key frame database 165.

The user access log 160 stores access data describing users' access and interactions with videos. The access data indicates whether a user watched an entire video, watched a video for a particular duration, skipped a video, jumped to a location in a video, watched a portion of a video, scrolled up or down through a web page including a video, shared a video with other users, added a video to a playlist, flagged a video, blocked a video from a playlist or a collection of videos, favorited a video, gave a video a favorable rating (e.g. "liked" a video using a FACEBOOK™ account or "+1'd" a video using a GOOGLE+™ account), gave a video an unfavorable rating (e.g. "thumbs down"). In one embodiment, the user access log 160 or another entity associated with the user access log 160 provides the users with the opportunity to opt-out of having the users' access data collected and/or shared with other modules in the video hosting service 100 or other services. The user analysis module 120 is configured to receive access data describing users' access and interactions with videos from the clients 123. The received access data is transmitted to the user access log 160 for storage.

The key frame database 165 stores key frame locations associated with videos stored in the video database 155. For each video in the video database 155, the key frame database 165 stores a list of key frame locations and associated portion lengths that delineate the portions of the video that are likely to be of interest to users. The video database 155 may not have key frame location and associated information stored from some videos in the database. A key frame is indicated by its frame number, time code, or other indexing values. The length of a portion is indicated by a number of frames in the portion, or an amount of time in the portion, or an identifier of the frame serving as the end of the portion. Additionally, in one embodiment, a key frame interest level is stored with each key frame location indicating a key frame's importance relative to other key frames.

Key frames are identified in a video based on a measure of the interest that users have shown, or are likely to show in certain frames of a video. The key frame module 130 may be configured to process user logs with respect to user interactions with a given video, and determine an access interest level of frames in the video. They key frame module 130 may also perform analysis on the content of a video and determine a content interest level of frames in the video based on identifying audio or visual content that is likely to be of interest to a user. Additionally, the key frame module 130 may perform heuristic analysis or other methods well known in the art to determine a likely level of interest from a user. Both audio and visual content of videos may be considered, alone or in combination, to determine the corresponding interest level of the frame. The analysis of video content and analysis of user access history may be utilized independently, or in combination to identify key frames or assign interest level. The key frame module 130 identifies key frames and corresponding portion length for the given video based on the content interest level and access interest level of frames. The key frame module 130 stores the key frames and corresponding portion lengths in the key frame database 165.

The video serving module 110 is configured to search the video database 155 for videos that satisfy the queries from a client 123 and provide the videos to the client 123. The video serving module also retrieves key frame information associated with videos from the key frame database 165 and prioritizes which sections of the video should be buffered based on the key frame information. In one embodiment, the client 123 or video player 125 may perform buffer requests based on information received from the video hosting service 100. Additionally, edge caching may be performed based on the identification of key frames. For example, if a portion of a video is buffered for a first user, the portion of the video may be edge cached to a content server closer to, or otherwise better able to serve, subsequent users buffering the portion of the video. The video serving module 110 supports searching on any fielded data for a video, including its title, description, metadata, author, category and so forth. Alternatively, users can browse a list of videos based on categories, such as most viewed videos, sports, animals, or automobiles. For example, the user may browse a list of videos related to cars and select which videos from the list to view.

When streaming a video to a client 123, the video serving module 110 is configured to buffer a current portion of the video near the current location of playback to enable playback without interruption as is well known in the art. Generally, the initial current location is at or near the beginning of the video. After buffering enough of the video to enable smooth playback, the video serving module 110 prioritizes buffering based on key frame information associated with the video so that a user may switch to portion of the video including the key frame without waiting for buffering. In an embodiment, after buffering the current portion of the video, key frame portions, identified by the key frame locations and associated portion lengths are prioritized buffered in chronological order. In another embodiment, key frame portions are prioritized and buffered based on their associated key frame interest level stored in the key frame database 165. The key frame portion with the highest key frame interest level is buffered first, and so on. After buffering all of the key frame portions, the video serving module proceeds with buffering unbuffered frames of the video in chronological order.

Figure 3:
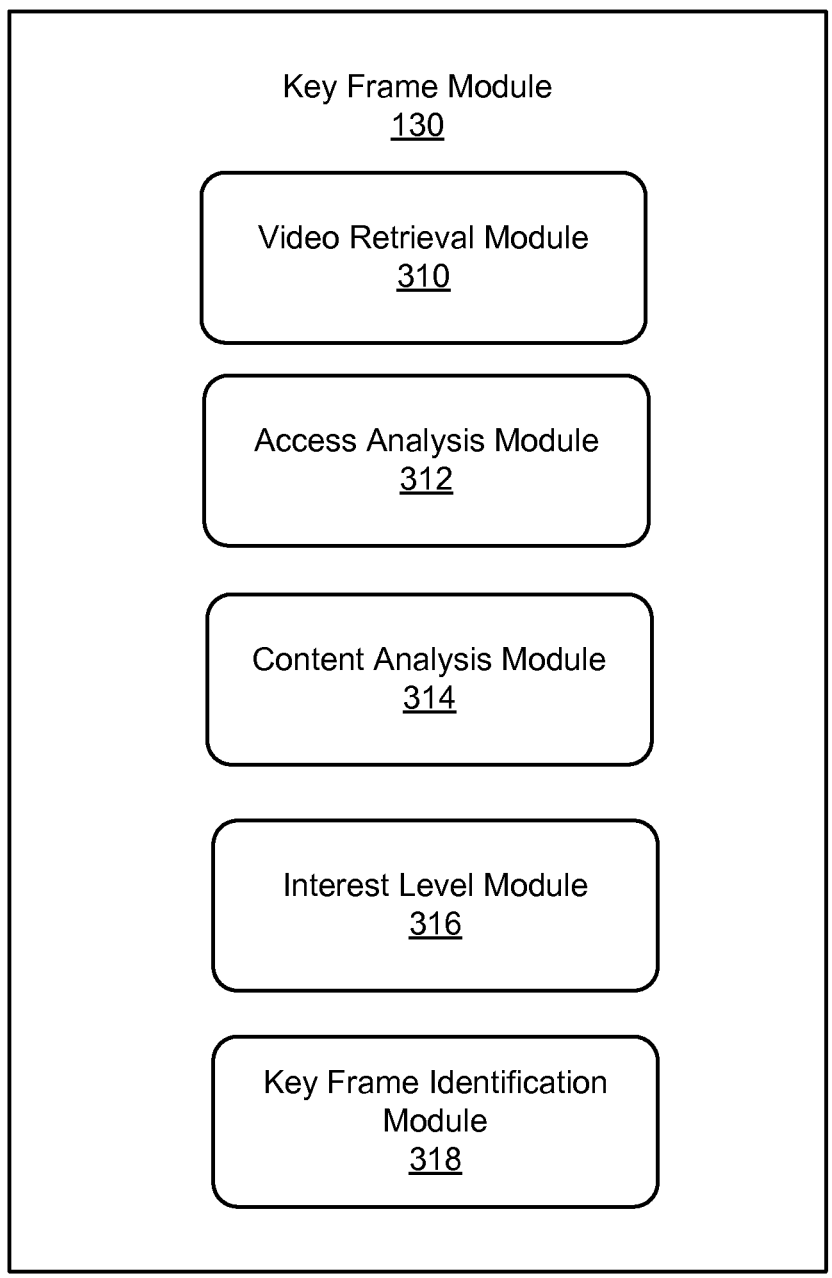
FIG. 3 is a block diagram illustrating a detailed view of the key frame module according to one embodiment.

FIG. 3 is a block diagram illustrating a detailed view of the key frame module 130, which is one means of performing this function, according to one embodiment. In some embodiments, the functions are distributed among the modules in a different manner than described herein. Moreover, the functions may be performed, or data stored, by other entities of the video hosting service 100. The key frame module is configured to determine and store key frame locations in the key frame database 165. In one embodiment, the key frame module is configured to perform analysis on all videos when they are initially stored in the video database. In addition, key frame analysis may be periodically performed as user access history and other related data are updated.

A video retrieval module 310 is configured to receive a video from the video database 155 and user access information associated with the video from the user access log 160 in order to perform analysis on the video and determine key frame portions of the video.

An access analysis module 312 is configured to analyze the user access information received by the video retrieval module 310 and determine an access interest level for frames of the video. For example, the access analysis module 312 analyzes the frames to which users have skipped to in a video, along with the number each such skips has occurred. The access analysis module 312 identifies user actions in the user access log 160 that took place while users were watching the video being analyzed by the access analysis module 312. In one embodiment, permission is requested from the user for storing or transmitting action reports to the access analysis module 312. In one embodiment, an access interest level is stored and associated with each frame or time code in the video for which user access is being analyzed by the access analysis module 312. The access interest level for each frame is increased or decreased based on actions performed by users and retrieved from the user access log 160. For example, a user skipping to a particular time code in a video, say at the 1:18.00 mark of a video, results in the access analysis module increasing the access interest level associated with the 1:18.00 mark of the video. Conversely, a user skipping away from the 1:18.00 mark of a video may cause the access analysis module 312 to decrease the access interest level of the 1:18.00 mark. As users may not take the same action at precisely the same frame, groups of frames may be analyzed and rated together. Additionally, a post processing step may evaluate interest levels of all frames to identify high interest areas and select an appropriate key frame, e.g., at a peak in interest level or slightly before a rise in interest levels. In an embodiment, if skipping to a time code increases the access interest by 1 and skipping away from a time code decreases the access interest by 1, the access interest level may be negative, or less than an initialized value when more users skip away from the time code than to the time code. In another embodiment, separate counts of skips to and away from video locations may be maintained separately, and the access interest level may be determined based on the ratio between the counts. Other actions which may positively affect interest level include pause, slow motion, adjusted playback rate, rewinds, skipping backward a certain number of seconds, skipping backward to the beginning of a chapter, or beginning playback through a link that specifies a start point in the video. Similarly, actions which may negatively affect interest level include stop, fast forward, skipping forward a certain number of seconds, or skipping forward to the begging of a chapter.

Both implicit and explicit user actions may be used to adjust the access interest associated with a certain time code or frame. Explicit feedback is input from the user primarily for the purpose of indicating a positive or negative reaction to a video. Implicit positive or negative feedback can be inferred from user inputs, though the inputs themselves may have a different primary function. For example, explicit actions may include liking, disliking, sharing or favoriting a video. The time code at which an explicit action is performed may be used to adjust the access interest level at that time code. In one embodiment, the time code which is affected by explicit actions may be adjusted by a delay time. For example, if a positive explicit action occurs at 2:05.00, it may be assumed that the user reacted to a prior portion of the video and the access interest level for time code 1:55.00 may be adjusted rather than 2:05.00. In one embodiment, the modification applied to explicit action time codes is a default time set by the video hosting service 100. Implicit actions may include skipping locations in a video or pausing at a certain temporal location of a video.

A content analysis module 314 is configured to analyze the retrieved video and determine a content interest level for frames of the video by performing analysis on the visual and audio content of the retrieved video. In one embodiment, certain sounds or visual cues are identified to assign content interest levels. Certain sounds or visual elements are designated by a manger of the video hosting service 110 to have a positive or negative effect on the content interest level of frames in which they are detected. The numerical effect that identified visual or audio objects will have on the content interest level may similarly be defined by a manger of the video hosting service 110 prior to performing automated analysis. In an embodiment, a combination of a sounds and visual elements may also cause the content interest level to be modified. Sound recognition software is configured to detect sounds in the video being analyzed such as car engine noise or gunshots. Sounds such as these that are likely to be of interest to the user increase the content interest level of frames they are detected in. For example, the sound of gun shots may be detected by the key frame module and indicate that the corresponding frame of a video is likely to be of interest to users. In one embodiment, heuristic analysis methods and/or machine learning can be utilized to determine whether audio or visual objects are likely to be of interest to a user. Patterns in key frames from other content can be used to detect patterns that are of interest.

Similarly, analysis is performed on the visual elements of the video. The analysis may include scene change or motion detection. Image recognition software may also be utilized on individual frames of the video to detect objects in the video. Objects such as a car, plane, or skateboard may be deemed by a manager of the video hosting service to have a positive or negative effect on interest levels. For example, if a car is detected in a certain frame of a video, the content interest level for that frame is increased as the user is more likely to be interested in that frame of the video. The presence, lack of presence, and degree of presence of both people and animals may also be used to determine interest levels. In one embodiment, recognition software, e.g., NEVEN VISION, may be utilized to perform image recognition enabling the assignment of interest levels. Similarly, any well-known or custom image or sound recognition algorithms can be used in the analysis of video and determination of interest levels.

An interest level module 316 utilizes the access interest level of frames determined by the access analysis module 312 and content interest level of frames determined by the content analysis module 314. The access interest level and content interest level may be used alone or in combination to determine an overall interest level. In an embodiment, the access interest level and content interest level of frames in a video are combined on a frame by frame basis so that each frame or time code in the video has an overall interest level. The values of the two interest levels may be summed without modification. Additionally, one or both of the interest levels may be scaled to adjust the importance placed on each type of interest level when calculating an overall interest level for a frame. For example, the weight of the access interest level when determining the overall interest level may be increased or decreased based on the number of user interactions for a video considered by the access analysis module 312 when determining the access interest level for each of the video's frames.

A key frame identification module 318 determines key frame information based on the interest levels calculated by the interest level module 316. The frames are grouped into groups of frames based on the overall interest level of frames and the proximity of frames to one another. In an embodiment, a grouping interest threshold may be determined relative to the overall interest levels of the frames of a video. A series of frames with an overall interest level exceeding the grouping interest threshold within a certain percentage of the video's length may then form a group. The key frame location of a group is a frame in the group such as the frame in the middle of the group or the frame with the highest overall interest level. In one embodiment, the key frame identification module 318 identifies a key frame as a frame that occurs before the frames in the group that are found to have an interest level higher than a threshold. Buffering can then begin at the key frame location and capture all of the likely interesting frames of the video. In another embodiment, centroid based clustering is performed on the frames based on their interest levels to identify key frame locations as a form of grouping. Video may be buffered prior to the key frame location in the video in order to buffer what led up to the frames of the video that are likely to be of interest to a user. For example, a k-means clustering algorithm may be used to identify clusters of interest levels and centroids of each cluster, each centroid being a key frame location. If a selected k-means algorithm requires the number of clusters to be specified in advance, the number of clusters may be selected based on video length.

For each identified key frame location, a portion length is determined indicating how much of the video surrounding the key frame location should be buffered along with the frame at the key frame location. The portion of the video identified by a key frame location and corresponding portion length is referred to as a key frame portion. The portion length may be identified by a number of frames extending from, centering on, or otherwise including the key frame location. In an embodiment, the portion length is a default value extending forwards from the key frame location for a default duration. Similarly, the portion length may also extend a default value backwards from the key frame location, or backwards and forwards from the key frame location. In another embodiment, the portion length of a key frame location is determined based on the interest level of frames near the key frame location. For example, frames may be included in the portion length if they exceed an absolute interest level threshold, or an interest level threshold relative to the interest level at the key frame location. In another embodiment, as each key frame location is the centroid of a cluster determined by a k-means clustering algorithm, all frames included in the key frame location's cluster are included in the key frame portion of the video identified by the portion length.

Additionally, for each key frame location, the overall interest level at the key frame location is stored as a key frame interest level. Additionally, a key frame interest level may be computed based on the overall interest levels of all frames within a key frames portion length. For example, the overall interest levels of all frames within the portion length are averaged. The key frame location, portion length, and key frame interest level are stored in the key frame database as a key frame.

Figure 4:
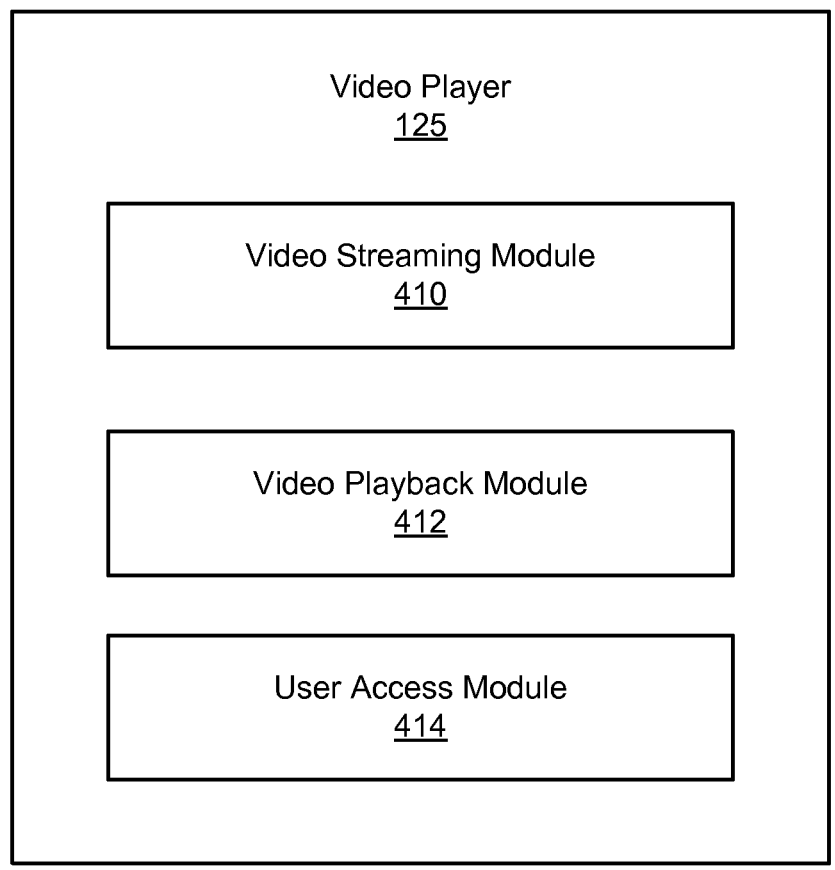
FIG. 4 is a block diagram illustrating a detailed view of the video player of a client according to one embodiment

FIG. 4 is a block diagram illustrating a detailed view of the video player 125 of a client 123 according to one embodiment. In some embodiments, the functions are distributed among the modules in a different manner than described herein. Moreover, the functions may be performed, or data stored, by other entities of the client 100. The video player 125 is configured to display videos retrieved from the video hosting service 100 and leverage key frame locations to enhance user experience.

A video streaming module 410 is configured to stream a video from the video hosting service 100 to the client 123. In an embodiment, the video streaming module 410 is also configured to receive key frame locations associated with the video being streamed. In one embodiment, the key frame locations are received as metadata of the streamed video. In another embodiment, the key frame locations are retrieved from the key frame database 165. The video streaming module 410 is configured to buffer portions of the streamed video based on the key frame locations. For example, rather than buffering entirely chronologically, the video streaming module 410 buffers enough of the beginning of the streamed video to begin playback, and then prioritizes buffering key frame portions of the video according to key frame information. As previously described, the key frame portions may be buffered chronologically, or prioritized based on their key frame interest levels.

A video playback module 412 displays the video for a user of the client 123. In one embodiment, it is graphically displayed where in the video key frame locations and/or key frame portions are located, e.g., indicated on a timeline of the video. Additionally, it may be graphically displayed which portions of a video have already been buffered. The video playback module 412 allows the user to seek or skip to certain sections of the video. In one embodiment, the video playback module 412 also enables forward and/or reverse variable skip in the video. Variable skip allows a user of the client 123 to skip to the nearest key frame location in the video, in whichever direction is selected. Drag, pointer, touch, or click based seeking my also "snap" to key frame locations or the closest frame within a key frame portion. In one embodiment, this occurs if the key frame location or portion is within a threshold of the chosen location. This enables adjustment of playback location after a seek operation according to key frame portions that are likely to be of interest to a user. This is particularly important when the method of seeking used by the user has some imprecision as is common in some touch screen devices. In one embodiment, the portions of video which are snapped to by the video playback module 412 are already buffered, but in other embodiments, portions of video may be snapped to based on interest level information regardless of whether buffering has occurred.

In one embodiment, video playback module 412 is configured to display thumbnails of a video while a cursor is moved along a timeline of the video. The thumbnail displayed corresponds to a frame of the video near the location of the cursor on the timeline. In one embodiment, the thumbnail displayed is a thumbnail of the key frame nearest the current location of the cursor on the timeline, or partially based on the location of key frames. In addition or alternatively, the thumbnail that is displayed when a user clicks on the timeline to jump to a section of the video featuring the thumbnail may affect the identity of key frames in the video. Jumping to a section of a video indicated by a thumbnail in the timeline may indicate that the selected section of video is of interest to the user.

A user access module monitors actions by the client 123 or the user of the client 123 and stores the actions as access data. The access data indicates whether a user watched an entire video, watched a video for a particular duration, skipped to a location in a video, watched a portion of a video, skipped a video, scrolled up or down through a web page including a video, shared a video with other users, added a video to a playlist, or various other actions. In one embodiment, the stored access data is transmitted to the video hosting service 100 for storage in the user access log 160. In another embodiment, the video hosting service 100 may determine actions taken by the user directly, without explicit identification and transmission of the actions by the client 123.

FIG. 2 is a high-level block diagram illustrating an example of a computer 200 for use as a video hosting server 100 or a client 123 according to one embodiment. Illustrated is at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is used in combination with the keyboard 210 to input data into the computer 200. The graphics adapter 212 displays images and other information on the display device 218. In some embodiments, the display device 218 includes touch screen capability for receiving user input and selections. The network adapter 216 couples the computer system 200 to the network 121. Some embodiments of the computer 200 have different or other components than those shown in FIG. 2. For example, the video hosting server 100 can be formed of multiple blade servers and lack a display device, keyboard, and other components.

The computer 200 is adapted to execute computer program modules for providing functionality described herein. As used herein, the term "module" refers to computer program instructions and/or other logic used to provide the specified functionality. Thus, a module can be implemented in hardware, firmware, or software. In one embodiment, program modules formed of executable computer program instructions are stored on the storage device 208, loaded into the memory 206, and executed by the processor 202.

Figure 5:
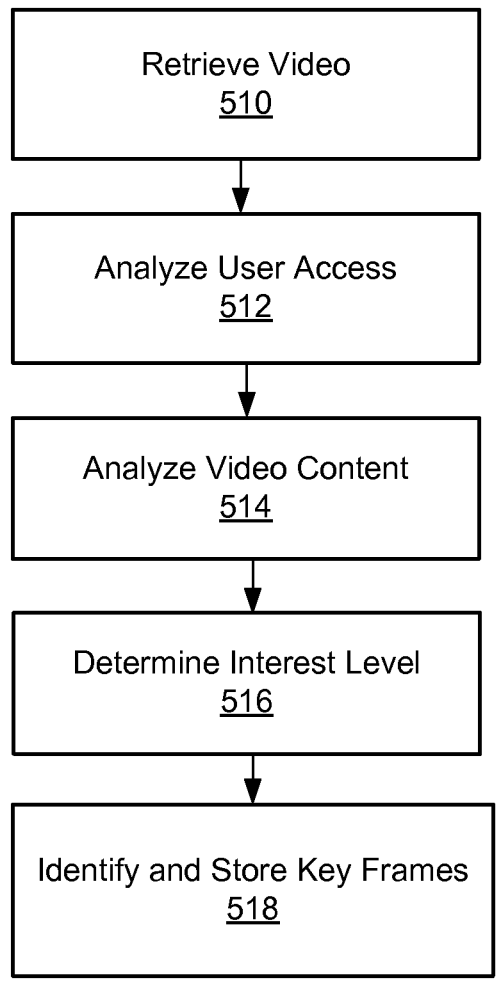
FIG. 5 is a flowchart illustrating a method of identifying and storing key frames of a video according to one embodiment.

FIG. 5 is a flowchart illustrating a method of identifying and storing key frames of a video according to one embodiment. While this description ascribes the steps of the method to modules in the key frame module 130, other entities can perform some or all of the steps in other embodiments. In addition, the method can perform the steps in different orders or include different steps.

The video retrieval module 310 retrieves 510 a video from the video database 155 and user access history from the user access log 160. Access histories for a plurality of users are then analyzed 512 by the access analysis module to determine an access interest level for one or more frames of the retrieved video. In one embodiment, analysis 512 may be performed as an ongoing process or occur in real time rather than accessing historical user access logs. The video's audio and visual content is analyzed 514 by the content analysis module 314 to identify portions of the video likely to be of interest to a user, and a content interest level is assigned for one or more frames of the retrieved video. The interest level module 316 determines 516 an overall interest level for each frame in the video by combining the access and content interest levels determined in steps 512 and 514. The overall interest levels of the frames are grouped and key frame information is identified 518. The key frame locations and portion lengths are stored 518 in the key frame database 165.

Figure 6:
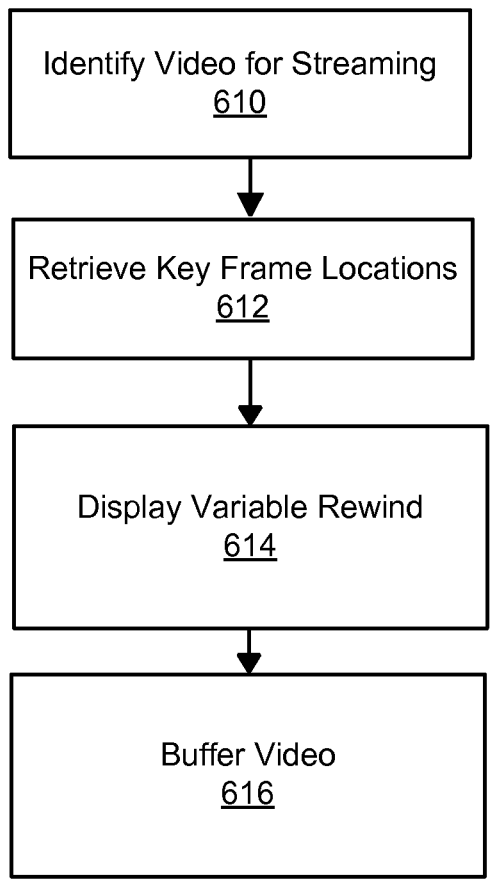
FIG. 6 is a flowchart illustrating a method of utilizing received key frame identifications to enhance video playback according to one embodiment.

FIG. 6 is a flowchart illustrating a method of utilizing received key frame identifications to enhance video playback according to one embodiment. While this description ascribes the steps of the method to the video player 125, other entities can perform some or all of the steps in other embodiments. In addition, the method can perform the steps in different orders or include different steps.

The video player 125 identifies 610 a video for streaming from the video hosting service 100. Key frame information for the identified video are retrieved 612 from the video hosting service 100 or from video metadata. Variable rewind options are displayed 614 to the user, allowing the user to skip to the nearest key frame location in either direction. The video player buffers 618 the video. When a video has been sufficiently buffered for continuous playback at the current location, the video player 125 proceeds with buffering and prioritizes key frame portions identified by key frame locations and portion lengths. The order in which key frame portions are buffered may be according to the key frame interest levels of the key frame locations.

Some sections of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and method for generating and utilizing key frames in videos. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

The invention claimed is:

1. A computer-implemented method for identifying key frames, comprising:
   receiving user access data for a video, the access data describing user interaction with the video;
   determining, from the user access data, an access interest level for each of a plurality of frames in the video;
   analyzing the content of the video to determine a content interest level for each of the plurality of frames in the video;
   determining an overall interest level for each of the plurality of frames based on the access interest level and content interest level;
   grouping the plurality of frames based on the overall interest levels of each of the plurality of frames to form a plurality of frame groups;
   identifying a plurality of key frame locations corresponding to one of the frames in each of the frame groups; and
   storing the plurality of key frame locations in a key frame database;
   for each key frame location, determining a key frame portion, the key frame portion including the key frame and additional frames of a portion length;
   for each key frame portion, determining a key frame portion interest level based on the overall interest levels of the key frame location and other frames in the key frame portion; and
   prioritizing the key frame portions for buffering by a client.

2. The method of claim 1, wherein analyzing the content of the video to determine a content interest level comprises identifying sounds in the video using sound recognition.

3. The method of claim 1, wherein analyzing the content of the video to determine a content interest level comprises identifying objects in the video using image recognition.

4. The method of claim 1, wherein determining the access interest level comprises identifying positive and negative user actions.

5. The method of claim 1, wherein the amount of key frame locations is based on the length of the video.

6. The method of claim 1, wherein buffered key frame portions are edge cached to a content server for buffering to subsequent clients.

7. A non-transitory computer-readable storage medium having executable computer program instructions embodied therein for identifying key frame locations, the instructions comprising instructions for:

receiving user access data for a video;
determining an access interest level based on the user access data for each of a plurality of frames in the video;
analyzing the content of the video to determine a content interest level for each of the plurality of frames in the video;
determining an overall interest level for each of the plurality of frames based on the access interest level and content interest level;
grouping the plurality of frames based on the overall interest levels of each of the plurality of frames to form a plurality of frame groups;
identifying a plurality of key frame locations corresponding to one of the frames in each of the frame groups; and
storing the plurality of key frame locations in a key frame database;
for each key frame location, determining a key frame portion, the key frame portion including the key frame and additional frames of a portion length;
for each key frame portion, determining a key frame portion interest level based on the overall interest levels of the key frame location and other frames in the key frame portion; and
prioritizing the key frame portions for buffering by a client.

8. The computer-readable storage medium of claim 7, wherein analyzing the content of the video to determine a content interest level comprises identifying sounds in the video using sound recognition.

9. The computer-readable storage medium of claim 7 wherein analyzing the content of the video to determine a content interest level comprises identifying objects in the video using image recognition.

10. The computer-readable storage medium of claim 7, wherein determining the access interest level comprises identifying positive and negative user actions.

11. The method of claim 6, wherein the amount of key frame locations is based on the length of the video.

12. The computer-readable storage medium of claim 7, wherein buffered key frame portions are edge cached to a content server for buffering to subsequent clients.

13. A computer-implemented method comprising:
receiving, by a video hosting server, user access data for a video, the user access data including a plurality of user interactions associated with the playback of the video;
analyzing the content of the video to identify audio and video events of interest in the video;
determining for each frame of the video an overall interest level, the overall interest level determined from the user access data and from the identified audio and video events;
identifying a plurality of key frame locations in the video based on the overall interest level associated with each frame of the video;
storing the plurality of key frame locations in a key frame database;
determining for each of the plurality of key frame locations a key frame portion, the key frame portion including the key frame location and a plurality of additional frames;
determining a key frame portion interest level for each of the key frame portions, each key frame portion interest level based on the overall interest level of the frames included in the key frame portion;
determining, for each of the key frame portions, a length of the key frame portion to buffer according to the key frame portion interest level for the key frame portion; and
prioritizing buffering of the key frame portions based on the key frame portion interest levels.

14. The computer-implemented method of claim 13, wherein the audio and video events of interest are determined by a manager of the video hosting server.

15. The method of claim 1 wherein determining an overall interest level for each of the plurality of frames includes summing a value for the access interest level for the frame and a value for the content interest level for the frame.

16. The method of claim 15 wherein at least one of the values is scaled according to a weighting prior to being summed.

* * * * *